United States Patent [19]

Bainbridge et al.

[11] 4,201,055
[45] May 6, 1980

[54] HYDRAULIC MASTER CYLINDER

[75] Inventors: Wilfred N. Bainbridge, Banbury; David Parsons, Kenilworth, both of England

[73] Assignee: Automotive Products Limited, Leamington Spa, England

[21] Appl. No.: 933,880

[22] Filed: Aug. 15, 1978

[30] Foreign Application Priority Data

Aug. 18, 1977 [GB] United Kingdom ............ 34757/77

[51] Int. Cl.² .................................................. B60T 11/20
[52] U.S. Cl. ......................................... 60/562; 60/578; 60/591; 303/6 C
[58] Field of Search ............... 60/562, 574, 578, 552, 60/554, 591; 303/6 C

[56] References Cited

U.S. PATENT DOCUMENTS

| | | | |
|---|---|---|---|
| 2,031,360 | 2/1936 | Boughton | 60/578 |
| 2,190,238 | 2/1940 | Lepersonne | 60/578 |
| 3,051,530 | 8/1962 | Ayers, Jr. | 303/6 C |
| 3,232,058 | 2/1966 | Ayers, Jr. | 60/562 |
| 4,027,482 | 6/1977 | Manzini | 60/578 |
| 4,117,681 | 10/1978 | Falk | 60/562 |

*Primary Examiner*—Abraham Hershkovitz
*Attorney, Agent, or Firm*—Kemon and Estabrook

[57] ABSTRACT

A tandem master cylinder for a vehicle split hydraulic braking system which has disc brakes in one half of the system and drum brakes in the other. One of the pistons in the master cylinder is prevented from developing a substantial pressure until a predetermined pressure has been developed by the other piston by virtue of a quantity of fluid trapped in a control chamber by a control piston. First and second valve means control the pressure in the control chamber. The valve means include a plunger which initially moves against a first control spring to allow a valve member to seat and trap the fluid in the control chamber and subsequently moves away from the valve member under an increased pressure in the control chamber against a second control spring to release the trapped fluid.

3 Claims, 1 Drawing Figure

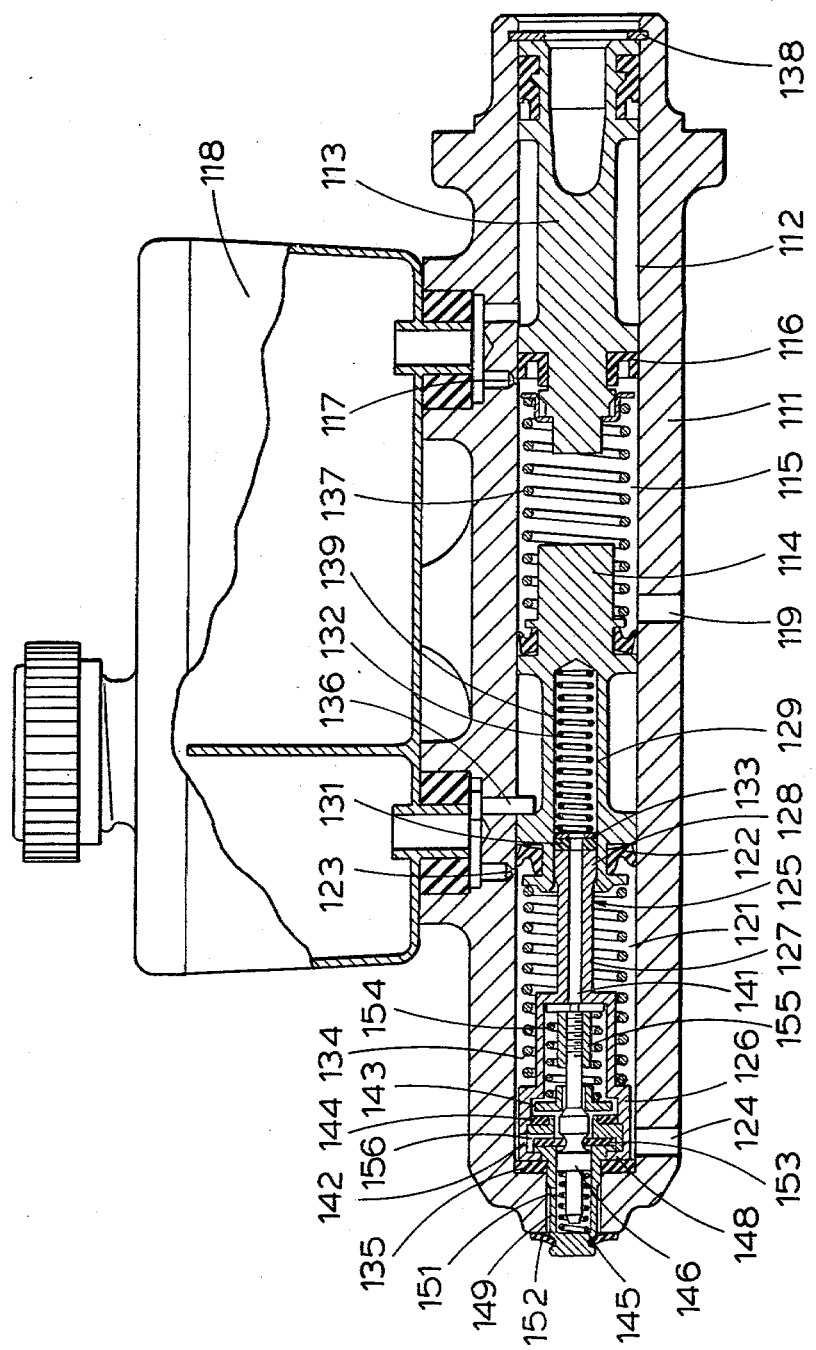

HYDRAULIC MASTER CYLINDER

The invention relates to hydraulic master cylinders for motor vehicle split braking systems of the kind in which disc brakes act on one set of wheels and drum brakes act on another set of wheels. In such braking systems it is some times desirable to prevent initial operation of the disc brakes until there is sufficient pressure in the drum brakes to overcome the effect of the usual brake shoe pull-off springs so that both sets of brakes start to work effectively at the same time.

Valves for performing such a function are known, but they are necessarily an additional expense.

In U.S. patent application Ser. No. 914,042 to the same assignee and incorporated herein by reference it has been proposed to provide a master cylinder for a motor vehicle split hydraulic braking system having disc brakes for acting on one set of wheels and drum brakes for acting on another set of wheels and which will delay initial operation of the disc brakes until the drum brakes start to work effectively. The master cylinder comprises a first chamber for connection to the drum brakes and which in use is pressurized by a first piston, a second chamber for connection to the disc brakes and which in use is pressurized by a second piston, a control chamber which in use is pressurized by a control piston which is operable to retard movement of the second piston in the direction which pressurized the second chamber. First and second valve means control the pressure in the control chamber in such a way that after an initial movement of the second piston in the brake applying direction the first valve means operates to allow the control piston to prevent a further increase in the pressure in the second chamber until the pressure in the first chamber has risen to a predetermined magnitude when the second valve means operates to allow pressure in the second chamber to increase. In the embodiment of the invention described the control piston is movable against a control spring to operate the second valve means. This is a constriction on the design of the master cylinder since the control spring must have sufficient strength to resist movement of the second piston until the second valve means opens.

It is an object of the present invention to provide an improved master cylinder of the kind which will delay initial operation of the disc brakes until the drum brakes start to work effectively.

The present invention provides a master cylinder of the kind described wherein the first and second valve means control communication from the control chamber to the second chamber and a valve member is biassed out of seating engagement with a first valve seat by a first control spring and biassed into engagement with a second valve seat on a valve plunger by a second, preloaded control spring which acts between the valve member and the valve plunger, the first valve means comprising the first valve seat and the valve member and the second valve means comprising the second valve seat and the valve member, the arrangement being such that in use the control chamber communicates with the second chamber through the first valve means until pressure in the second the control chambers caused by brake-applying movement of the second piston acts on the valve plunger to move the valve plunger, the second control spring and the valve member against the bias of the first control spring and seat the valve member on the first valve seat, thus blocking communication from the control chamber to the second chamber, and the valve plunger is moved against the bias of the second control spring by an increased pressure in the control chamber to unseat the valve member from the second valve seat and re-open communication from the third chamber to the second chamber when pressure in the first chamber reaches said predetermined value.

The invention will now be described by way of example and with reference to the accompanying drawing which shows a cross-section through a tandem hydraulic master cylinder according to the invention.

The tandem master cylinder shown in the drawing includes a body 111 having a bore 112 in which are slidable a first (or primary) piston 113 and a second (or secondary) piston 114.

The primary piston 113 is of conventional construction, being adapted to be moved in a brake applying direction towards the second piston 114 by a push-rod connected to a driver's brake pedal to pressurize a first (or primary) chamber 115 between the primary piston 113 and the secondary piston 114 when a seal 116 passes a recuperation port 117 connected to the usual hydraulic reservoir 118, the primary chamber 115 being connected to the rear drum brakes of a vehicle to which the master cylinder is fitted through a port 119.

The secondary piston 114 is of mainly conventional construction, being movable in a brake applying direction towards the closed end of the bore 112 by pressure generated in the primary chamber 115 to pressurize a second (or secondary) chamber 121 formed between the secondary piston 114 and the closed end of bore 112 when a seal 122 passes another recuperation port 123 connected to the fluid reservoir 118, the secondary chamber being connected to the front disc brakes of the vehicle through a port 124.

A control piston 125 comprises a housing portion 126, a stem portion 127 and a head 128 which is slidable in a blind bore 129 in the secondary piston 114. A rubber seal ring 131 is biassed into contact with the end face of the head 128 by a light compression spring 132 acting through a washer 133. The usual secondary piston return spring 134 holds the housing portion 126 in sealing abutment with a rubber washer 135 situated at the closed end of bore 112 and ensures that the secondary piston 114 is returned to abut a stop pin 136 after brake actuation. Another return spring 137 ensures that the primary piston 113 is returned to abut a snap ring 138.

In use the control piston 125 does not move relative to the body 111 but acts to retard movement of the secondary piston 114 in the brake applying direction to pressurize a control chamber 139 defined by the blind bore 129 and the piston head 128. Pressure in the control chamber 139 is controlled by first and second valve means situated in the housing portion 126 by the metering of flow from the control chamber 139 through an axial passage 141 in the stem and head portions 127 and 128 and a hole 142 into the secondary chamber 121.

The first valve means comprises an annular valve member 143 which is biassed out of engagement with a first valve seat formed on the exposed face of a rubber washer 144 by a first control spring 145 acting through a valve plunger 146. Rubber washer 144 is situated in a recess formed by the housing portion 126 and a rigid washer 147 which is retained in the end of the housing portion 126 by a peened-over flange 148. Flange 148 also retains another flange formed as part of a tubular plunger housing 149 which is received in an axial drilling in the end wall of the master cylinder body 111. The bore of the plunger housing 149 houses the first control spring 145 and receives the valve plunger 146, the chamber which houses spring 145 being vented through a hole 151 and a clearance between the housing and the axial drilling in the cylinder body 111. Another rubber washer 152 prevents the ingress of dirt and moisture. The control piston 125 and the plunger housing 149 together with the components assembled therein form a convenient sub-assembly for insertion into the end of the master cylinder bore 12.

A further rubber washer 153 is sandwiched between the flange of the plunger housing 149 and washer 147 and fits into a semi-circular groove in the stem of the valve plunger 146 to act as a diaphragm type seal between plunger 146 and the plunger housing 149.

The second valve means includes a second, frustoconical, valve seat on the valve plunger 146 and the annular valve member 143, the annular valve member 143 being biassed into engagement with the second valve seat by a second, preloaded, control spring 154 which acts between the valve member 143 and a retaining collar 155 screwed onto the plunger 146.

The valve plunger 146 is slidable in housing portion 126. The housing portion, control piston, first and second valve means form a sub-assembly for insertion into the master cylinder bore.

When the master cylinder is not being operated the parts are in the positions shown in the drawing. The control chamber 139 is at the pressure of the fluid reservoir 118 since the annular valve member 143 is unseated from washer 144, grooves 156 in the rigid washer 147 allowing communication through hole 142 and a screwdriver slot in collar 155 allowing communication through axial passage 141.

When the primary piston 113 is moved towards the closed end of bore 112, pressure builds up in both the primary chamber 115 and the secondary chamber 121. To prevent unnecessary wear of the disc brakes connected to port 124 while the primary chamber 115 is generating sufficient pressure to overcome the pull-off springs of the drum brakes connected to port 119, the first valve means operates at a low value of pressure in the secondary and control chambers 121 and 139 to prevent communication from the control chamber 139 to the secondary chamber 121 by the action of the valve plunger 146 moving with the annular valve member 143 and the pre-loaded second control spring 154 against the load of the first control spring 145 to allow the annular valve member 143 to seat on washer 144.

With continuing movement of the primary piston 113 towards the closed end of bore 112, pressure in the primary chamber 115 increases but pressure in the secondary chamber 121 remains at, or slightly above, the said low value as fluid trapped in the control chamber 139 by the control piston 125 impedes movement of the secondary piston 114 towards the closed end of bore 112. However, pressure in the control chamber 139 increase with increasing pressure in the primary chamber 115 until the pressure difference across the seating area of the valve plunger 146 is sufficient for the plunger 146 to move against the bias of both the first control spring 145 and the second control spring 154 to allow a small quantity of fluid to escape from the control chamber 139 into the secondary chamber 121. Thus the second valve means operates at a pressure in the control chamber 39 corresponding to a predetermined value of pressure in the primary chamber 115 to re-open communcation from the control chamber 139 to the secondary chamber 121.

The effect of the quantity of fluid escaping from the control chamber 139 into the secondary chamber 121 is for the pressure in the secondary chamber 121 to rise, reducing the pressure drop across the seating area of the valve plunger 146 and causing plunger 146 to re-seat on the annular valve member 143. This unseating and re-seating continues with increasing pressure in the primary chamber 115 so that pressure in the secondary chamber 121 progressively increases until the pressure on the valve plunger 146 is sufficient to overcome the combined spring loads of the first and second control springs 145 and 154, the plunger 146 then remaining unseated from the annular valve member 143 and the pressures in the primary and secondary chambers 115 and 121 being equalized.

The invention has been described with particular reference to tandem master cylinders but is not restricted to this type since it is also applicable to twin-bore cylinders in which the first and second pistons are arranged side-by-side in twin parallel bores and are operated through a beam or similar mechanism which apportions the driver's effort.

We claim:

1. A master cylinder for a motor vehicle split hydraulic braking system having disc brakes for acting on one set of wheels and drum brakes for acting on another set of wheels, the master cylinder comprising a housing body, first and second bore portions in the housing body, first and second pistons slidable in said first and second bore portions respectively, a first chamber in the housing body for connection to the drum brakes and which in use is pressurized by the first piston, a second chamber in the housing body for connection to the disc brakes and which in use is pressurized by the second piston, a blind bore in one of said first and second pistons, a control piston connected to said housing body, the control piston being slidable in said blind bore, a control chamber in said one piston defined by the blind bore and the control piston, pressure in the control chamber acting to retard movement of the second piston in the brake applying direction, first valve means operable to trap a quantity of hydraulic fluid in the control chamber when the second piston has made an initial movement in the brake-applying direction and second valve means operable to release fluid from the control chamber when pressure in the control chamber has risen to a predetermined magnitude, wherein the improvement comprises:

said first valve means comprises a first valve seat in the housing body, a valve member for co-operation with said first valve seat to close communication from the control chamber to the second chamber, a valve plunger movable by pressure in the second and control chambers and a first control spring acting to bias the valve plunger against the pressure in the second and control chambers, the valve plunger acting on the valve member under the bias of said first control spring to unseat the valve member from said first valve seat;

and said second valve means comprises a second valve seat on the valve plunger which co-operates with the valve member to prevent communication from the control chamber to the second chamber and a second, preloaded, control spring which acts between the valve member and the valve plunger to seat the valve member on said second valve seat, the valve plunger being further movable by the pressure in the second and control chambers against said second control spring to unseat the valve member from said second valve seat.

2. A tandem master cylinder according to claim 1, wherein said blind bore is in the second piston.

3. The master cylinder of claim 2 further comprising a plunger housing in which the valve plunger is slidable, the plunger housing, control piston and said first and second valve means together forming a sub-assembly for insertion into the master cylinder bore.

* * * * *